United States Patent
Ishiyama et al.

(10) Patent No.: US 9,971,068 B2
(45) Date of Patent: May 15, 2018

(54) CELLULOSE ACYLATE FILM, POLARIZING PLATE, LIQUID CRYSTAL DISPLAY DEVICE

(71) Applicant: FUJIFILM Corporation, Tokyo (JP)

(72) Inventors: Jun Ishiyama, Kanagawa (JP); Masaki Hachiya, Kanagawa (JP); Hirofumi Toyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 15/083,835

(22) Filed: Mar. 29, 2016

(65) Prior Publication Data

US 2016/0291212 A1 Oct. 6, 2016

(30) Foreign Application Priority Data

Mar. 31, 2015 (JP) .................. 2015-074243

(51) Int. Cl.
  *G02B 5/30* (2006.01)
  *B32B 7/10* (2006.01)
  *G02B 1/14* (2015.01)

(52) U.S. Cl.
  CPC .................. *G02B 1/14* (2015.01); *B32B 7/10* (2013.01); *G02B 5/305* (2013.01)

(58) Field of Classification Search
  CPC .............. G02B 5/305; B32B 7/04; B32B 7/10
  See application file for complete search history.

(56) References Cited

U.S. PATENT DOCUMENTS

| | | | | |
|---|---|---|---|---|
| 2007/0273815 A1* | 11/2007 | Moto | ........................ | C08J 5/18 349/117 |
| 2010/0015395 A1* | 1/2010 | Otoshi | .................. | B29C 43/222 428/141 |
| 2010/0055356 A1* | 3/2010 | Takeda | ...................... | B32B 7/02 428/1.31 |
| 2010/0271574 A1* | 10/2010 | Ikeda | ...................... | B29C 41/32 349/96 |
| 2011/0223435 A1* | 9/2011 | Naito | ...................... | B29C 41/28 428/461 |
| 2011/0292324 A1* | 12/2011 | Kaihoko | .................. | C08B 3/06 349/96 |
| 2012/0013828 A1* | 1/2012 | Takagi | .................. | G02B 5/305 349/96 |
| 2013/0029122 A1* | 1/2013 | Fukagawa | .................. | C08J 5/18 428/216 |
| 2013/0083274 A1* | 4/2013 | Fujiwara | .................... | B32B 7/02 349/96 |
| 2013/0107175 A1* | 5/2013 | Kamohara | ................ | C08L 1/12 349/96 |
| 2013/0169897 A1* | 7/2013 | Tanihara | ............. | G02F 1/13363 349/15 |
| 2013/0195787 A1* | 8/2013 | Combs | ...................... | C08B 3/06 424/70.13 |
| 2013/0335681 A1* | 12/2013 | Tamagawa | .................. | C08J 5/18 349/84 |
| 2014/0333874 A1* | 11/2014 | Sato | ...................... | G02B 5/0242 349/64 |
| 2015/0015832 A1* | 1/2015 | Nagura | ................ | G02B 5/3033 349/96 |
| 2015/0198742 A1* | 7/2015 | Hisakado | ............... | C08K 5/151 428/1.31 |
| 2015/0219815 A1* | 8/2015 | Sato | ...................... | G02B 5/3033 359/489.07 |
| 2017/0088681 A1* | 3/2017 | Ishiyama | .................. | C08J 5/18 |

FOREIGN PATENT DOCUMENTS

| | | |
|---|---|---|
| JP | 2011-162769 A | 8/2011 |
| JP | 2012-063492 A | 3/2012 |
| JP | 2012-098646 A | 5/2012 |

OTHER PUBLICATIONS

Machine Translation of JP 2012-63492, 2018 (Year: 2018).*
Notification of Reasons for Refusal issued by the Japanese Patent Office dated Jan. 16, 2018 in connection with Japanese Patent Application No. 2015-074243.

* cited by examiner

*Primary Examiner* — Liam J Heincer

(74) *Attorney, Agent, or Firm* — Edwards Neils LLC; Jean C. Edwards, Esq.

(57) ABSTRACT

There is provided a cellulose acylate film including a core layer and a skin layer, in which a mixed layer is formed between the core layer and the skin layer, wherein a cellulose acylate included in the core layer has an average acyl substitution degree S2 of 2.00 to 2.55, a cellulose acylate included in the skin layer has an average acyl substitution degree S3 of 2.60 to 2.95, and an average acyl substitution degree S1 of the cellulose acylate of the mixed layer satisfies Equation (A1), and the mixed layer has a thickness of 100 nm to 300 nm: Equation (A1): $S2+0.05\times(S3-S2)<S1<S3-0.05\times(S3-S2)$.

5 Claims, 1 Drawing Sheet

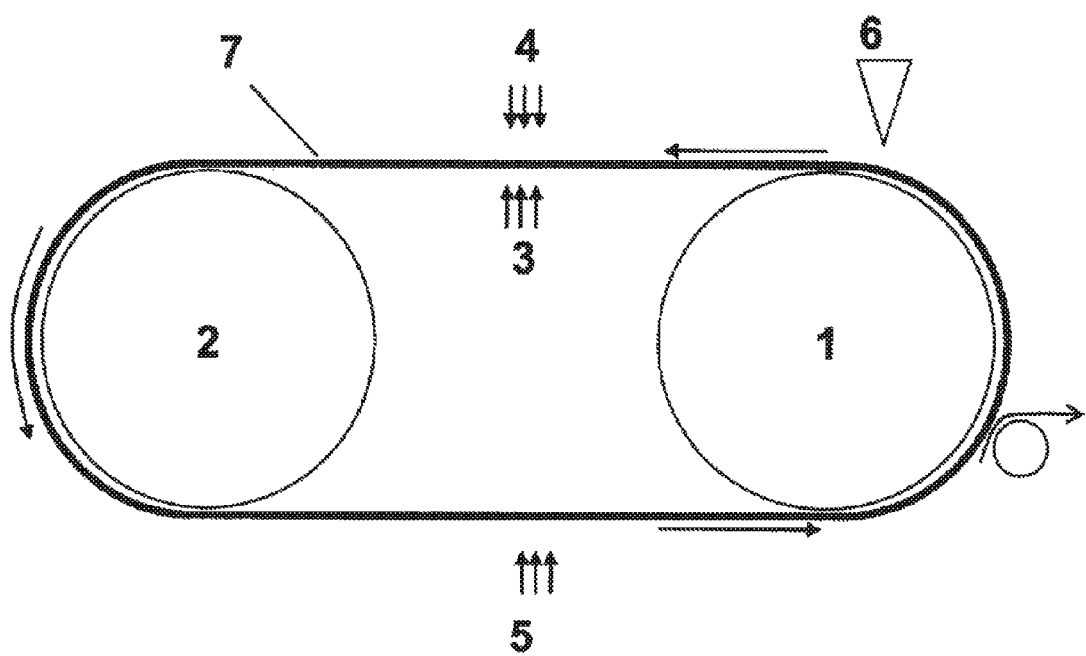

CELLULOSE ACYLATE FILM, POLARIZING PLATE, LIQUID CRYSTAL DISPLAY DEVICE

CROSS REFERENCE TO RELATED APPLICATION(S)

This application claims priority from Japanese Patent Application No. 2015-074243 filed on Mar. 31, 2015, the entire disclosures of which are incorporated herein by reference.

BACKGROUND

1. Technical Field

The present invention relates to a cellulose acylate film, a polarizing plate and a liquid crystal display device.

2. Related Art

Films of polymers represented by cellulose acylates, polyesters, polycarbonates, cycloolefin polymers, vinyl polymers, polyimides and the like have been used in silver halide photographic light-sensitive materials, phase difference films, polarizing plates and image display devices. Films which are better in terms of planarity and uniformity may be produced from these polymers, so that these polymers have been widely employed as films for optical applications. For example, a cellulose acylate film having an appropriate water vapor permeability may be directly joined online to a polarizer composed of the most commonly used polyvinyl alcohol (PVA) and iodine. For this reason, a cellulose acylate, particularly, a cellulose acetate film has been widely employed as protective films for the polarizing plates.

When cellulose acylate films are used for the optical applications, laminated films including a core layer and a skin layer having different acyl substitution degrees have been recently developed from the viewpoint of improving various characteristics of cellulose acylate films.

For example, Japanese Patent Laid-Open Publication No. 2011-162769 (hereinafter JP-A-2011-162769) discloses a cellulose acylate film in which a dope A for an inner layer (core layer) having an acyl substitution degree of 2.43 and a dope B for a surface layer (skin layer) having an acyl substitution degree of 2.81 are laminated by co-casting.

Further, Japanese Patent Laid-Open Publication No. 2012-098646 (hereinafter JP-A-2012-098646) describes a phase difference film containing the same specific additive in a predetermined amount in a core layer and a skin layer as a phase difference film which includes a skin layer including a cellulose acylate having an acyl substitution degree of 2.90 on both surfaces of a core layer including a cellulose acylate having an acyl substitution degree of 2.20.

However, when the laminated film including a core layer and a skin layer described in JP-A-2011-162769 is applied to a polarizing plate, a liquid crystal display panel, and the like, there are some cases where the skin layer and the core layer are easily peeled off and the yield is reduced when the polarizing plate is cut off after the polarizer and the film are joined, when an edge face is polished, when the polarizing plate is re-joined to glass in the case where problems occur in the process of joining the polarizing plate to glass, or the like.

In addition, the phase difference film described in JP-A-2012-098646 is intended to enhance adhesion between layers, but has problems in that adhesion force is easily lacking, the kind and addition amount of additive are limited, and the like when stretching conditions are adjusted for the purpose of optical characteristics, and the like.

From those described above, an object of the present invention is to provide a cellulose acylate film including a core layer and a skin layer, in which the cellulose acylate film has a uniform surface shape and has excellent interlayer adhesion without being limited by additives, and the like, and a polarizing plate and a liquid display device, which include the cellulose acylate film. Furthermore, another object of the present invention is to provide a production method, which may produce the cellulose acylate film while maintaining a uniform surface shape without increasing the number of processes.

The present inventors have intensively studied, and as a result, have found that the above-described problems may be solved by forming, between the core layer and the skin layer having different average acyl substitution degrees from each other, a mixed layer which is mixed with cellulose acylate contained in both layers, in a specific thickness.

That is, the present invention has the following configuration.

SUMMARY (1) A cellulose acylate film including a core layer and a skin layer, in which a mixed layer is formed between the core layer and the skin layer, wherein a cellulose acylate included in the core layer has an average acyl substitution degree $S2$ of 2.00 to 2.55, a cellulose acylate included in the skin layer has an average acyl substitution degree $S3$ of 2.60 to 2.95, and an average acyl substitution degree $S1$ of the cellulose acylate of the mixed layer satisfies Equation (A1), and the mixed layer has a thickness of 100 nm to 300 nm:

$$S2+0.05\times(S3-S2)<S1<S3-0.05\times(S3-S2). \quad \text{Equation (A1)}$$

(2) The cellulose acylate film according to (1), wherein an in-plane retardation Re (550) at a wavelength of 550 nm and a retardation Rth (550) in a thickness direction at a wavelength of 550 n m satisfy the following Equation (1) and Equation (2):

$$30 \text{ nm} \leq Re(550) \leq 80 \text{ nm} \quad \text{Equation (1)}$$

$$80 \text{ nm} \leq Rth(550) \leq 200 \text{ nm}. \quad \text{Equation (2)}$$

(3) The cellulose acylate according to (1) or (2), wherein a difference between the average acyl substitution degree of the cellulose acylate contained in the core layer and the average acyl substitution degree of the cellulose acylate contained in the skin layer is 0.81 or less.

(4) A polarizing plate including a polarizer and the cellulose acylate film according to any one of (1) to (3), wherein the polarizer is joined to the skin layer.

(5) The polarizing a plate according to (4), wherein an adhesive force between the polarizer and the cellulose acylate film is 4.0 N or more.

According to an aspect of the present invention, it is possible to provide a cellulose acylate film including a core layer and a skin layer, in which the cellulose acylate film has a uniform surface shape and has excellent interlayer adhesion without being limited by additives, and the like, and a polarizing plate and a liquid display device, which include the cellulose acylate. Further, according to the present invention, it is possible to provide a production method which may produce the cellulose acylate film while maintaining a uniform surface shape without increasing the number of processes.

BRIEF DESCRIPTION OF DRAWINGS

FIG. 1 is a schematic view illustrating a film casting film formation apparatus for describing a method for producing a cellulose acylate film.

DETAILED DESCRIPTION OF EXEMPLARY EMBODIMENTS

Hereinafter, the cellulose acylate film of as an aspect of the present invention will be described in detail. The description of the constituent elements described below will be made based on representative embodiments of the present invention, but the present invention is not limited to those embodiments. In addition, the numerical value range expressed by using "to" in the present specification means a range including the numerical values described before and after "to" as the lower limit value and the upper limit value, respectively.

[Cellulose Acylate Film]

The cellulose acylate film of the present invention (hereinafter, also referred to as the film of the present invention) is a cellulose acylate film including a core layer and a skin layer, in which a mixed layer is formed between the core layer and the skin layer, a cellulose acylate included in the core layer has an average acyl substitution degree S2 of 2.00 to 2.55, a cellulose acylate included in the skin layer has an average acyl substitution degree S3 of 2.60 to 2.95, an average acyl substitution degree S1 of a cellulose acylate in the mixed layer satisfies Equation (A1), and the mixed layer has a thickness of 100 nm to 300 nm.

$$S2+0.05\times(S3-S2)<S1<S3-0.05\times(S3-S2). \quad \text{Equation (A1)}$$

When the cellulose acylate included in the core layer has an average acyl substitution degree of 2.00 or more, the mixed layer is easily formed, and when the average acyl substitution degree is 2.55 or less, optical characteristics are excellent.

When the cellulose acylate included in the skin layer has an average acyl substitution degree of 2.60 or more, the saponification suitability is excellent, and when the average acyl substitution degree is 2.95 or less, the mixed layer is easily formed.

[Cellulose Acylate]

A cellulose acylate included in the core layer, the skin layer, and the mixed layer will be described.

The cellulose acylate is an ester of cellulose with a carboxylic acid in which the carboxylic acid is preferably a fatty acid having 2 to 22 carbon atoms, more preferably a lower fatty acid having 2 to 4 carbon atoms, and most preferably a fatty acid having 2 carbon atoms.

Examples of the cellulose as a cellulose acylate raw material include cotton linter, wood pulp (broad leaf pulp, and needle leaf pulp) and the like, a cellulose acylate obtained from any raw material cellulose may be used, and in sonic cases, mixtures of such cellulose acylate may be also used. For detailed descriptions on these raw material celluloses, it is possible to use celluloses described, for example, in "Lecture on Plastic Materials (17) Cellulose Resins" (written by Maruzawa, Uta, The NIKKAN KOGYO SHIMBUN, Ltd., published in 1970) or Japan Institute of Invention and Innovation, Open Technical Report No. 2001-1745 (pages 7 to 8), and the cellulose acylate film of the present invention is not particularly limited.

The cellulose acylate is obtained by substituting a hydroxyl group of cellulose with an acyl group, and the acyl group has preferably 2 to 22 carbon atoms. The acyl group having 2 to 22 carbon atoms may be an aliphatic group or an aryl group, is not particularly limited, and may be a single acyl group or a mixture of two or more kinds of acyl groups. Examples thereof include an alkylcarbonyl ester, an alkenylcarbonyl ester, an aromatic carbonyl ester, or an aromatic alkylcarbonyl ester of cellulose, and the like, and these esters may have a further substituted group. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadedanoyl group, an octadecanoyl group, an i-butanoyl group, a t-butanoyl group, a cyclohexanecarbonyl group, an oleoyl group, a benzoyl group, a naphthylcarbonyl group, a cinnamoyl group, and the like. Among them, preferred are an acetyl group, a propionyl group, a butanoyl group, a dodecanoyl group, an octadecanoyl group, a t-butanoyl group, an oleoyl group, a benzoyl group, a naphthylcarbonyl group, a cinnamoyl group, and the like, and more preferred are an acetyl group, a propionyl group, and a butanoyl group. An acetyl group and a propionyl group are even more preferred, and an acetyl group is most preferred.

The polymerization degree of cellulose acylate is, in terms of viscosity average polymerization degree, 180 to 700, and for cellulose acetate, more preferably 180 to 550, even more preferably 180 to 400, and particularly preferably 180 to 350. The average polymerization degree may be measured by the limiting viscosity method of Uta, et al. {Uta Kazuo, and Saito Hideo, "Journal of The Society of Fiber Science and Technology Japan", vol. 18, No. 1, pages 105 to 120 (1962)}. This method is also described in detail in Japanese Patent Laid-Open Publication H9-95538.

The molecular weight distribution of cellulose acylate is evaluated by using N-mnethylpyrrolidone as a solvent using gel permeation chromatography (GPC-8020 (trade name) manufactured by Tosoh Corporation), and it is preferred that the cellulose acylate has a small polydispersity index Mw/Mn (Mw stands for mass average molecular weight and Mn stands for number average molecular weight) and a narrow molecular weight distribution. The specific Mw/Mn value is preferably 1.0 to 4.0, more preferably 2.0 to 4.0, and most preferably 2.3 to 3.4.

(Substitution Degree of Cellulose Acylate)

The cellulose acylate used in the present invention is a product resulting from acylation of hydroxyl groups of cellulose, and with respect to the measurement of the substitution degree of an acyl group with a hydroxyl group of cellulose, the substitution degree may be obtained by measuring the binding degree of substituting acetic acid and/or an aliphatic acid having 3 to 22 carbon atoms to hydroxyl groups of cellulose, and calculating the measured values(s). The measurement may be carried out in accordance with ASTMD-817-91 as a measurement method.

[Core Layer]

The core layer in the cellulose acylate film of the present invention contains a cellulose acylate having an average acyl substitution degree of 2.00 to 2.55. The content of the cellulose acylate in the core layer is preferably 60% by mass to 100% by mass, more preferably 70% by mass to 100% by mass, and even more preferably 80% by mass to 100% by mass, based on the total mass of the core layer.

The average acyl substitution degree of the cellulose acylate included in the core layer is 2.00 to 2.55, more preferably 2.10 to 2.50, and particularly preferably 2.15 to 2.50. The thickness of the core layer is preferably 10 μm to 60 μm, more preferably 15 μm to 55 μm, and even more preferably 20 μm to 50 μm.

The thickness of the core layer is calculated by measuring the thickness of the entire layers using a needle contact-type film thickness meter, and subtracting the thickness of the skin layer.

[Skin Layer]

The skin layer in the cellulose acylate film of the present invention contains a cellulose acylate having an average acyl substitution degree of 2.60 to 2.95. The content of the cellulose acylate in the skin layer is preferably 60% by mass to 100% by mass, more preferably 70% by mass to 100% by mass, and even more preferably 80% by mass to 100% by mass, based on the total mass of the skin layer.

The average acyl substitution degree of the cellulose acylate included in the skin layer is 2.60 to 2.95, more preferably 2.65 to 2.90, and particularly preferably 2.70 to 2.85. The thickness of the skin layer is preferably 0.3 μm to 5 μm, more preferably 0.3 μm to 3 μm, and even more preferably 0.3 μm to 2 μm.

The thickness of the skin, layer is measured using FE300 (manufactured by Otsuka Electronics Co., Ltd.).

The skin layer may be on one surface or on both surfaces of the core layer.

The difference between the average acyl substitution degree of the cellulose acylate contained in the core layer and the average acyl substitution degree of the cellulose acylate contained in the skin layer is preferably 0.81 or less, more preferably 0.25 to 0.76, and even more preferably 0.30 to 0.71. When the difference between the average acyl substitution degree of the cellulose acylate contained in the core layer and the average acyl substitution degree of the cellulose acylate contained in the skin layer is 0.81 or less, a mixed layer is easily formed, and an interlayer adhesive force is enhanced. In addition, when the acyl substitution degree is 0.25 or more, optical expression properties and saponification suitability are particularly excellent.

[Mixed Layer]

The film of the present invention is a cellulose acylate film including a core layer and a skin layer, in which a mixed layer is formed between the core layer and the skin layer, a cellulose acylate included in the core layer has an average acyl substitution degree S2 of 2.00 to 2.55, a cellulose acylate included in the skin layer has an average acyl substitution degree S3 of 2.60 to 2.95, an average acyl substitution degree S1 of a cellulose acylate in the mixed layer satisfies Equation (A1), and the mixed layer has a thickness of 100 nm to 300 nm.

$$S2+0.05\times(S3-S2)<S1<S3-0.05\times(S3-S2) \quad \text{Equation (A1)}$$

In the mixed layer, the cellulose acylate having an average acyl substitution degree of 2.00 to 2.55 and the cellulose acylate having an average acyl substitution degree of 2.60 to 2.95 are present in mixture, and preferred ranges of the average acyl substitution degree of each cellulose acylate are the same as those described above.

It is thought that in the mixed layer, the cellulose acylate having an average acyl substitution degree of 2.00 to 2.55 and the cellulose acylate having an average acyl substitution degree of 2.60 to 2.95 are in a state of being mixed while being diffused from the core layer and the skin layer, and the cellulose acylate contained in the core layer and the cellulose acylate contained in the skin layer are entangled with each other, thereby enhancing adhesion between the core layer and the skin layer.

When the cellulose acylate contained in the core layer and the cellulose acylate contained in the skin layer are excessively mixed, a cellulose acylate having low substitution degree is present in the vicinity of the outermost layer of the film, the film thickness unevenness of the skin layer is generated, or the surface shape deteriorates due to a whitening of the film by bringing a saponification solution into contact with the film, so that the thickness of the mixed layer is 300 nm or less. Furthermore, when the thickness of the mixed layer is 100 nm or more, an effect of enhancing adhesion ma y be sufficiently obtained.

The thickness of the mixed layer is preferably 100 nm to 300 nm, more preferably 120 nm to 250 nm, and even more preferably 150 nm to 210 nm.

(Method for Measuring Thickness of Mixed Layer)

The cellulose acylate film is obliquely cut at an angle of 1° with respect to the surface of the film toward the thickness direction of the film from the surface of the film at the skin layer side, and the produced inclined surface of the film is analyzed using time of flight-secondary ion mass spectrometry (TOF-SIMS). In the present invention, a secondary ion intensity distribution is obtained by measuring a range which includes all of the skin layer, the mixed layer, and the core layer of the film, for example, a range of 500 μm in width from a position which is 5 μm away in an inclined direction from the end of the surface of the film at the skin layer side in the produced inclined surface of the film by cutting the film, using TOF-SIMS5 (trade name) manufactured by ION-TOF Corp. Accordingly, it is possible to quantify the secondary ion intensity of the cellulose acylate film including the skin layer, the mixed layer, and the core layer in the thickness direction. Here, the intensity ratio f is calculated by detecting the secondary ion intensity for fragment ion A (m/z169) and fragment ion B (m/z127) derived from cellulose molecules, and using the intensity of each fragment ion obtained and the following Equation (4).

$$f=(\text{Ion intensity of } B)/(\text{Ion Intensity of } A) \quad \text{Equation (4)}$$

Since a higher average acyl substitution degree leads to a smaller intensity ratio f, and the intensity ratio f assumes a linear relationship with the average acyl substitution degree, f corresponds to the average acyl substitution degree. Accordingly, in a laminated body including a core layer and a skin layer, which are composed of cellulose acylates having different substitution degrees, it is possible to calculate a distribution of intensity ratio f corresponding to a distribution of the average acyl substitution degree of the cellulose ac y late film in the thickness direction from the measurement.

When f of the position of x (nm) of the cellulose acylate film measured by TOF-SIMS in the thickness direction is defined as fx, the range of x of the film in which fx satisfies Equation (A2) in the thickness direction is defined as a thickness of the mixed layer.

$$fs\pm0.05\times(fc-fs)\leq fx<fc-0.05\times(fc-fs). \quad \text{Equation (A2)}$$

In the fs in Equation (A2), fx and fc are de fined as the minimum value and the maximum value, respectively in a range of 500 μm in width from the position which is 5 μm away in an inclined direction from the end of the surface at the skin layer side in the inclined surface of the film.

A is a fragment ion derived from a structure which includes an acyl substituent of the cellulose acylate, B is a fragment ion derived from a structure which does not include an acyl substituent of the cellulose acylate.

$C_8H_9O_4+$(m/z 169)      Chemical Formula (1)

$C_6H_7O_3+$(m/z 127)      Chemical Formula (2)

Further, it is also possible to change the starting position in the measurement range measured by TOE-SIMS, the width of the measurement range, and number of measurements for widening the measurement range, if necessary.

[Additives]

As the additive of the cellulose acylate film in the present invention, publicly-known additives may be used, and specific examples thereof include an Rth controlling agent adjusting agent, a peeling accelerator, a plasticizer, an infrared absorbent, a matting agent, and the like.

[Method for Producing Cellulose Acylate Film]

The method for producing a cellulose acylate film according to the present invention is a method for producing a cellulose acylate film including a core layer and a skin layer, the method including the processes of co-casting a dope for forming a core layer, which contains a cellulose acylate having an average acyl substitution degree of 2.00 to 2.55 and a dope for forming a skin layer, which contains a cellulose acylate having an average acyl substitution degree of 2.60 to 2.95 and a solvent, and drying the co-cast dope, in which the film surface temperature of the dopes is maintained at −2° C. to 30° C. while the dopes are co-cast, and then a residual solvent amount represented by the following Equation (3) is dried to 100%.

$$\text{Residual solvent amount} = \{(\text{the film thickness of the film while being dried} - \text{the film thickness of the completely dried film})/\text{the film thickness of the completely dried film}\} \times 100(\%) \quad \text{Equation (3)}$$

Hereinafter, the method for producing a cellulose acylate film according to the present invention will be described in detail.

(Preparation of Dope)

In the method for preparing a film according to the present invention, it is preferred that the film is produced by a solvent cast method. In the solvent cast method, the film may be produced by co-casting using the solutions (the dope for forming a core layer and the dope for forming a skin layer) of the above-described cellulose acylate having a specific average acyl substitution degree each dissolved in an organic solvent.

The organic solvent preferably includes a solvent selected from ethers having 3 to 12 carbon atoms, ketones having 3 to 12 carbon atoms, esters having 3 to 12 carbon atoms, and halogenated hydrocarbons having 1 to 6 carbon atoms. The ethers, ketones and esters may have a cyclic structure. A compound having two or more functional groups from ethers, ketones and esters (that is, —O—, —CO—, and COO—) may also be used as the organic solvent. The organic solvent may have other functional groups such as an alcoholic hydroxyl group. In the case of an organic solvent having two or more functional groups, the number of carbon atoms may be within a certain range for a compound having any functional group.

Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole.

Examples of the ketones having 3 to 12 carbon atoms include acetone, methylethylketone, diethylketone, diisobutylketone, cyclohexanone, and methylcyclohexanone. Examples of the esters having 3 to 12 carbon atoms include ethyl formate, propyl formate, pentyl formate, methyl acetate, ethyl acetate, and pentyl acetate.

Examples of the organic solvents having two or more functional groups include 2-ethoxyethyl acetate, 2-methoxy ethanol, and 2-butoxy ethanol.

The number of carbon atoms of the halogenated hydrocarbon is preferably 1 or 2, and most preferably 1. Halogen in the halogenated hydrocarbon is preferably chlorine. The ratio of hydrogen atoms, substituted with halogens, in the halogenated hydrocarbon is preferably 25 mol % to 75 mol %, more preferably 30 mol % to 70 mol %, even more preferably 35 mol % to 65 mol %, and most preferably 40 mol % to 60 mol %. Methylene chloride is a representative halogenated hydrocarbon.

Two or more organic solvents may be used in mixture.

In the present invention, a cellulose acylate solution may be prepared by a general method. The general method means that treatment is carried out at a temperature of 0° C. or more (normal temperature or high temperature). The solution may be prepared using a method and device for preparing a dope in a typical solvent cast method. Further, in the case of the general method, it is preferred to use a halogenated hydrocarbon (particularly, methylene chloride) as the organic solvent.

It is preferred that the amount of cellulose acylate in the dope for forming a core layer and the dope for forming a skin layer is adjusted to 10% by mass to 20% by mass in the solution each obtained. The amount of cellulose acylate is more preferably 12% by mass to 18% by mass. Any additive to be described below may be added to the organic solvent (main solvent).

The solvent may be prepared by stirring cellulose acylate and the organic solvent at normal temperature (0° C. to 40° C.). The solution at high concentration may be stirred under pressurized and heated conditions. Specifically, cellulose acylate and the organic solvent are put in a pressure vessel and hermetically sealed, and followed by stirring under pressure while heating at a temperature of the boiling point or more of the solvent at normal temperature and at a temperature within a range where the solvent is not boiled. The heating temperature is usually 40° C. or more, preferably 60° C. to 200° C., and more preferably 80° C. to 110° C.

Each component may be coarsely mixed in advance, and then put into the vessel. Furthermore, the components may be successively charged into the vessel. The vessel needs to be configured such that stirring may be carried out. The vessel may be pressurized by injecting an inert gas such as a nitrogen gas. Further, a rise in the vapor pressure of the solvent by heating may be utilized. Alternatively, each component may be added under pressure after hermetically sealing the vessel.

In the case of heating, it is preferred that heating is carried out from the outside of the vessel. For example, a jacket type heating device may be used. In addition, the whole vessel may also be heated by installing a plate heater in the outside of the vessel and laying a pipe to circulate a liquid therein.

It is preferred to provide a stirring blade in the vessel and carry out a stirring operation using the stirring blade. The stirring blade has preferably a length so as to reach the vicinity of a wall of the vessel. It is preferred that a scraping blade is provided at the terminal of the stirring blade in order to renew a liquid film of the wall of the vessel.

Measuring instruments such as a pressure gauge and a thermometer may be installed in the vessel. In the vessel, each component is dissolved in a solvent. The prepared dope is cooled and then taken out from the vessel, or taken out from the vessel and then cooled by using a heat exchanger or the like.

(Casting)

The film is formed by casting the dope on a drum or a hand, and then vaporizing the solvent. It is preferred that he dope for forming a core layer and the dope for forming a skin before casting are adjusted such that each of the solid content thereof becomes from 11% by mass to 21% by mass.

By setting the content of the solid content of the dope to the range, the core layer and the skin layer are effectively mixed, and it is possible to obtain a film with uniform film thickness and optical characteristics of the core layer and the skin layer.

It is preferred that the surface of the drum or the band is finished to have a specular state. A casting and drying method in the solvent cast method is described in U.S. Pat. Nos. 2,336,310, 2,367,603, 2,492,078, 2,492,977, 2,492, 978, 2,607,704, 2,739,069 and 2,739,070, U.K. Patent Nos. 640731 and 736892, and \Japanese Patent Laid-Open Publication Nos. S45-4554, S49-5614, S60-176834, S60-203430, and S62-115035.

It is preferred that the dope is cast onto a drum or a band having a surface temperature of −5° C. to 12° C. After the casting, the dope may be brought into contact with drying air, but from the viewpoint of forming the mixed layer, the film surface temperature is maintained at preferably −2° C. to 30° C. until the residual solvent amount is dried to 100%, and maintained at more preferably 5° C. to 28° C. From the viewpoint of reducing the time until the residual solvent is peeled off from the casting, it is preferred that the residual solvent amount is dried by drying air at 60° C. or more in the residual solvent amount of 100% or less.

By using the dope for forming a core layer and the dope for forming a skin layer prepared by the above-described method, a method for producing a cellulose acylate film by co-casting will be described below.

FIG. 1 is a schematic view illustrating a film casting film formation apparatus for describing a method for producing a film according to the present invention. However, the apparatus used in the production method of the present invention is not limited to the form illustrated in FIG. 1.

The production method of the present invention includes a process of casting at least two dopes including cellulose acylate onto a support. As illustrated in FIG. 1, the film casting film formation apparatus is equipped with a casting band (support) 7 laid between a rotating roller 1 and a rotating roller 2, a co-casting die 6 for extruding each dope onto the casting band 7, drying devices 4 and 5 for bringing the dope into contact with drying air from the dope side on the band after casting, and a temperature controlling device 3 for controlling the band temperature by bringing the dope into contact with drying air from the back surface side of the band. Moreover, although not being illustrated in the drawing, but a tenter type drier, a salvage cutting device, a drying chamber, a cooling chamber, a winding chamber, and the like are preferably disposed at the downstream of the casting film formation apparatus. The tenter type dryer may be again provided at the hack of the drying chamber.

As a material for the co-casting die 6, a precipitation hardening type stainless steel is preferred, and a stainless steel having a thermal expansion coefficient of $2 \times 10^{-5}$ (° C.$^{-1}$) or less is preferred. It is also possible to use a stainless steel having a corrosion resistance nearly equivalent to that of SUS316 by a forced corrosion test in an aqueous electrolyte solution, or a stainless steel having a corrosion resistance in which pitting (perforation) is not produced at a gas-liquid interface even though being immersed in a mixed solution of dichloromethane, methanol, and water for 3 months as a material for the co-casting die 6. Further, it is preferred that the co-casting die 6 is prepared by performing grinding processing on a material which is one or more months old after being founded. Accordingly, the dope evenly flows inside, the co-casting die 6, and thus may prevent stripes and the like from being produced on a casting film to be described below.

It is preferred that as the finishing accuracy of the liquid contact surface of the co-casting die 6, the surface roughness is 1 μm or less and the straightness is 1 μm/m or less in any direction. The clearance of the slit of the co-casting die 6 may be adjusted in a range of 0.5 mm to 3.5 mm by automatic adjustment. For each part of the liquid contact part of the lip front end of the co-casting die 6, the R is set to 50 μm or less over the entire width. In addition, it is preferred that the shear velocity inside the co-casting die 6 is adjusted to 1 to 5,000 (l/sec).

The width of the co-casting die 6 is not particularly limited, but the width of the film of a final product is preferably 1.1 times to 2.0 times. In addition, it is preferred that a temperature controller is attached to the co-casting die 6 such that the temperature during the film formation is maintained at a predetermined temperature, and it is preferred that a coat hanger-type die is used for the co-casting die 6. Here, in the production method of the present invention, the casting width is preferably 1,900 mm or more, and may be 2,100 mm or more in some cases.

Furthermore, in the production method of the present invention, it is preferred that the casting is performed such that the thickness of the dry film becomes 10 μm to 60 μm. For that reason, it is more preferred that thickness adjusting bolts (heat bolts) are installed at predetermined intervals in a width direction of the co-casting die 6, and thus, an automated thickness adjusting mechanism by heat bolts is provided in the co-casting die 6. It is preferred that the film formation is performed by setting a profile for the heat bolt depending upon the amount of liquid fed of a pump according to a previously set program. Alternatively, it is preferred to use a high-precision gear pump as the pump.

In this case, a feedback control may be conducted by an adjusting program based on a profile of a thickness meter. Examples of the thickness meter include an infrared thickness meter, and the like, but are particularly not limited thereto. It is preferred that, except a casting edge part, difference in thickness at any two points in a width direction of the product film is adjusted to be within 1 μm and the difference between minimum and maximum values in thickness in the width direction is adjusted to be 3 μm or less, and it is more preferred that the difference is adjusted to 2 μm or less. Alternatively, it is preferred to use a film where thickness precision is adjusted to be ±1.5 μm or less.

It is more preferred that a cured film is formed on the lip front end of the co-casting die 6. Although there is no particular limitation for the method for forming a cured film, there may be exemplified ceramics coating, hard chromium plating, nitriding treatment methods, and the like. When ceramics is used as a cured film, it is preferred to be able to be ground, have a low poring rate, be non-fragile, have excellent corrosion resistance, have a good close adhesion to the co-casting die 6, and have poor adhesion to the dope. Specific examples thereof include tungsten carbide (WC), $Al_2O_3$, TiN, $Cr_2O_3$, and the like, but among them, WC is preferred. The WC coating may be carried out by a thermal spraying method.

In order to prevent a local drying and solidification of the dope flowing out, it is preferred to attach a solvent supply device (not illustrated) to the slit end of the co-casting die 6. Further, it is preferred that a solvent which makes the dope soluble is supplied to the surrounding part of the contact line of three phases formed by both ends of the casting beads, end of die slit and outer air. As the solvent, a mixed solvent including 86.5 parts by mass of dichloromethane, 13 parts by mass of acetone and 0.5 parts by mass of n-butanol is suitably used. In this case, it is preferred that it is possible to prevent foreign substances from being mixed into the casted film when the solvent is supplied at 0.1 ml/min to 1.0 ml/min to one side of the ends. Alternatively, as a pump for supplying the liquid, it is preferred to use a pump where a pulsation rate is 5% or less.

On the lower area of the co-casting die 6, there is provided a casting band 7 laid between rotating rollers 1 and 2. The rotating rollers 1 and 2 are rotated by a driving device which is not illustrated and, as a result of the rotation, the casting band runs without an end. With regard to the casting band, the moving rate thereof, that is, the casting rate is preferably 10 m/minute to 200 m/minute, more preferably 20 m/minute or more, and particularly preferably 40 m/minute or more. In addition, it is preferred that the rotating rollers 1 and 2 are equipped with a heat transfer medium circulating device in order to adjust the surface temperature of the casting band to a predetermined value. With regard to the casting band, it is preferred that the surface temperature thereof is able to be adjusted to −20° C. to 40° C. In the rotating rollers 1 and 2 used in the present embodiment, a heat transfer medium channel (not illustrated) is formed and, when a heat transfer medium maintained at a predetermined temperature passes therein, the temperature of the rotating rollers 1 and 2 is maintained at a predetermined value.

Although there is no particular limitation for the width of the casting band 7, it is preferred to use a band where the width is within a range of 1.1 times to 2.0 times of the casting width of the dope, and it is preferred for the casting band to be polished such that the length is 20 m to 200 m, the thickness is 0.5 mm to 2.5 mm, and the surface roughness is 0.05 μm or less. It is preferred that the casting band is made of stainless steel and, in order to give sufficient corrosion resistance and strength, it is more preferred that the casing band is made of SUS 316. Furthermore, with respect to the casting band 7, it is preferred to use a casting band where the total thickness unevenness thereof is 0.5% or less.

It is preferred that the co-casting die 6 or the casting band 7 is placed in a casting chamber. It is preferred that the casting chamber is equipped with a temperature-conditioning apparatus for maintaining the inner temperature at a predetermined value and a condenser 66 for condensing and recovering the evaporating organic solvent. Moreover, it is preferred that a recovering device for recovering the condensed and liquefied organic solvent is provided at the outer area of the casting chamber. It is preferred that a decompression chamber for pressure controlling the back surface part of casting beads formed from the co-casting die to the casting band is disposed.

(Drying)

The production method of the present invention preferably has (1) a process of controlling drying of the dope after the co-casting by adjusting the temperature of the dope surface being brought into contact with the band depending on the temperature of the rotating roller 1 (initial drying process);

(2) a process of drying the dope dried in (1) from both ends thereof in a drying device 4 which dries the dope from a side which is not brought into contact with the band and a temperature controlling device 3 which dries the surface of the dope which is brought into contact with the band (intermediate drying process); and (3) a process of, in the dope dried in (2), again drying the surface of the dope which is brought into contact with the hand by controlling the temperature of the rotating roller 2, and subsequently drying the surface of the dope with is not brought into contact with the band in a drying device 5 (post drying process).

It is preferred that the drying in (2) is carried out by setting the temperature of the rotating roll 1 to −5° C. to 12° C. In this case, even though the dope is brought into contact with drying air, the film surface temperature is maintained at preferably −2° C. to 26° C. and more preferably 5° C. to 24° C., and controlled at more preferably 9° C. to 20° C. It is preferred that the dope is dried to 150% as the residual solvent at the temperature, and then the process of (2) is conducted. When the film surface temperature is too high, it is difficult to form an interlayer mixed layer, but when the film temperature is too low, stain is easily attached onto the band, and thus, the film becomes irregular.

Alternatively, the film surface temperature refers to the surface temperature of the film, and may be measured by a non-contact type infrared thermometer. The measuring device is not particularly limited, but the temperature may be measured using a non-contact handy thermometer (IT2-80, manufacture by Keyence Corporation).

It is preferred that the drying in (2) is carried out by setting the temperature of the back surface of the band and the temperature of drying air on the upper portion of the band to the ranges of 12° C. to 24° C. and. 30° C. to 40° C., respectively, and the dope is dried by controlling the film surface temperature of the film to preferably 15° C. to 30° C., more preferably 18° C. to 28° C., and even more preferably 18° C. to 25° C. It is preferred that the dope is dried to 100% as the residual solvent at the temperature, and then the process of (3) is conducted.

It is preferred that the drying in (3) is efficiently carried out by setting the temperature of the rotating roll 2 to 30° C. or more, and adjusting the air temperature of the drying device 5 to 60° C. or more. In this case, it is preferred that the residual solvent amount during the peeling is adjusted to 15% to 60%. When the drying is insufficient, the film is deformed, and thus become irregular during the peeling.

In the production method of the present invention, the residual solvent amount after the dope is cast in the drying process is represented by the following Equation (3).

Residual solvent amount={(the film thickness of the film while being dried−the film thickness of the completely dried film)/the film thickness of the completely dried film}×100(%)  Equation (3)

Further, the completely dried film refers to a film in which the residual solvent amount is 0.1% or less when the residual solvent amount is again calculated by Equation (3). In addition, the film thickness of the film while being dried is a film thickness measured by a non-contact type film thickness meter at any time point, and the film thickness of the completely dried film is a film thickness measured by the same method after the web is dried at 110° C. for 3 hours.

According to the production method of the present invention, two cellulose acylates having different average acyl substitution degrees are diffused on a surface where the dope for forming a core layer is brought into contact with the dope for forming a skin layer by co-casting, and adhesion between the core layer and the skin layer may be enhanced as both cellulose acylates are entangled with each other. Furthermore, since the progression of diffusion may be adjusted by controlling the film surface temperature of the drying process, a mixed layer having a desired thickness may be formed.

Further, according to the production method of the present invention, since the mixed layer may be formed by only the process of co-casting where the temperature is controlled, a cellulose acylate film having excellent adhesion may be easily produced without increasing the number of processes.

(Peeling)

The film dried in the drying device 5 is peeled off from the casting band at a peeling point, and transferred to any downstream process. It is preferred that during the peeling, the film is supported by a roller for peeling (hereinafter, referred to as a peeling roller), and a peeling position where the casting film is peeled off from the casting band is constantly maintained. The peeling roller may be a driving roller which includes a driving unit and is rotated in the circumferential direction. Alternatively, it is preferred that the peeling is carried out in a casting band on a rotating roller which supports a casting band. When the casting band is circulated and returns to the casting position from the peeling position, a new dope is again cast.

(Stretching)

The film peeled from the support may be stretched.

The stretching may be performed by 5% to 50% in a width direction (transverse direction) orthogonal to a longitudinal direction (a conveying direction in which the film is conveyed). In addition, the stretching may be a biaxial stretching in combination with a stretching in a direction (for example, longitudinal direction) which does not coincide with the width direction. The stretching ratio in the width direction is 5% to 50%, and preferably 8% to 45%. Furthermore, the stretching ratio in the longitudinal direction is preferably 0% to 20%, more preferably 0% to 15%, and even more preferably 0% to 10%, Stretching in two-axis directions orthogonal to each other is an effective method from the viewpoint of enhancing the optical expression properties of the film, particularly, adjusting the Rth value of the film. Further, Re may be more appropriately expressed by setting the stretching ratio to 5% or more, and haze may be reduced by setting the stretching ratio to 50% or less.

Alternatively, the "stretching ratio (%)" referred to as in the present specification means a stretching ratio obtained by the following equation with respect to the length of the film in the stretching direction.

Stretching ratio (%)=100×{(length after stretching)−(length before stretching)}/(length before stretching)

Structures of a co-casting die, a decompression chamber, and a support, co-casting, peeling-off methods, stretching, a drying condition of each process, handling methods, curling, winding methods after planarity correction and recovering methods of a solvent, and recovering methods of a film are described in detail in paragraph nos. [0617] to [0889] of Japanese Patent Laid-Open Publication No. 2005-104148, and the descriptions thereof may also be applied to the present invention.

[Characteristics of Cellulose Acylate Film]

(Film Thickness)

The film thickness of the cellulose acylate film of the present invention is preferably 10 μm to 60 μm, more preferably 15 μm to 55 μm, and even more preferably 20 μm to 50 μm. The film thickness of 25 μm or more is preferred in view of handleability when the film is processed in a polarizing plate and the like.

(Retardation of Film)

In the present specification, Re(λ) and Rth(λ) each indicate an in-plane retardation and a retardation in a thickness-direction at a wavelength λ. Re is measured by making a light having a wavelength of λ nm incident in the normal direction of the film in KOBRA21ADH (manufactured by Oji Scientific Instruments Co., Ltd.).

Rth is calculated by means of a KOBRA 21 ADH based on the measured retardation values measured in the total three directions of a retardation value measured by making a light having a wavelength of λ nm incident from a direction inclined at +40° to the normal direction of the film by using an in-plane slow axis (determined by the KOBRA 21 ADH) as a tilt axis (rotation axis) and a retardation value measured by making a light having a wavelength of λ nm incident from a direction inclined at −40° to the normal direction of the film by using an in-plane slow axis as a tilt axis (rotation axis). Here, as for the assumed value of average refractive index, values described in Polymer Handbook (JOHN WILEY & SONS, INC.) and catalogues of various optical films may be used. A value of average refractive index that has not yet been known may be measured by means of an Abbe refractometer. Values of average refractive index of main optical films will be exemplified below: cellulose acylate (1.48), cycloolefin polymer (1.52), polycarbonate (1.59), polymethyl methacrylate (1.49), and polystyrene (1.59). KOBRA 21ADH calculates nx, ny, and nz by inputting the assumed value of average refractive index and the film thickness. Based on the calculated nx, ny and nz, Nz=(nx−nz)/(nx−ny) is again calculated.

Alternatively, Re=(nx−ny)×d, and Rth={(nx+ny)/2−nz}×d. nx is a refractive index of the film in an in-plane slow axis direction, ny is a refractive index of the film in an in-plane fast axis direction, nz is a refractive index of the film in a thickness direction, and d is the thickness (nm) of the film.

For the cellulose acylate film of the present invention, it is preferred that the in-plane retardation Re (550) at a wavelength of 550 nm and the retardation Rth (550) in a thickness direction at a wavelength of 550 nm satisfy the following Equation (1) and Equation (2).

30 nm≤Re(550)≤80 nm     Equation (1)

80 nm≤Rth(550)≤200 nm     Equation (2)

When the cellulose acylate film is used in a liquid crystal display device of VA mode, there is obtained an effect in which it becomes difficult to view all of the light leakage when observed from the front and the light leakage when observed from the inclination by satisfying Equation (1) and Equation (2).

[Polarizing Plate]

The polarizing plate of the present invention includes a polarizer and at least one of the film of the present invention.

When the film of the present invention is used as a protective film for a polarizing plate, the film may be preferably used as a configuration of a protective film for a polarizing plate/a polarizer/a protective film for a polarizing plate/a liquid crystal cell/a protective film for a polarizing plate according to the present invention la polarizer/a protective film for a polarizing plate, or a configuration of a protective film for a polarizing plate/a polarizer/a protective film for a polarizing plate according to the present invention/a liquid crystal cell/a protective film for a polarizing plate according to the present invention/a polarizer/a protective film for a polarizing plate. In particular, as the film of the present invention is used while being joined to a liquid crystal cell of TN type, VA type, OCB type, and the like, it is possible to provide a display device having better viewing angle, less coloration, and excellent visibility.

The polarizing plate of the present invention is a polarizing plate having a protective film at both sides of the polarizer, and is preferably a polarizing plate in which at least one of the protective film is the cellulose acylate film of the present invention. That is, it is preferred that the film of the present invention is used in a protective film for a polarizing plate. It is preferred that the polarizing plate is formed by joining and stacking a surface of the skin layer of the protective film on at least one surface of the polarizer as described above, and it is preferred to join a thick surface of the mixed layer to the protective film when the protective film includes a skin layer at both sides thereof As the polarizer, a publicly known polarizer in the related art may be used, and, for example, a hydrophilic polymer film such as a polyvinyl alcohol film is treated with a dichroic dye such as iodine and stretched. The joining of the cellulose acylate film to the polarizer is not particularly limited, and may be carried out by an adhesive composed of an aqueous solution of an aqueous polymer, or a UV curable adhesive. Specifically, as an adhesive composed of a n aqueous solution of an aqueous polymer, an aqueous complete saponification type polyvinyl alcohol solution is preferably used. As the UV curable adhesive, a radical polymerizable acrylate monomer, a canonically polymerizable epoxy monomer, and an oxetane monomer are used, and a photo-radical generator or a photo-acid generator may be used as an initiator.

[Liquid Crystal Display Device]

The liquid crystal display device of the present invention includes a liquid crystal cell and at least one of the polarizing plate of the present invention. Further, the liquid crystal display device of the present invention is a liquid crystal display device including a liquid crystal cell and two polarizing plates disposed at both sides thereof, and is more preferably a liquid crystal display device in which at least one of the polarizing plate is the polarizing plate of the present invention.

The liquid crystal display device of the present invention is preferably a liquid crystal display device in which the liquid crystal cell is a liquid crystal cell of VA mode or TN mode, and a liquid crystal display device in which the liquid crystal cell is a VA mode cell is particularly preferred from the viewpoint that the film of the present invention expresses Re and Rth in the preferred range.

The cellulose acylate film of the present invention and a polarizing plate using the film may be used in liquid crystal cells and liquid crystal display devices of various display modes. Various display modes such as twisted nematic (TN), in-plane switching (IPS), ferroelectric liquid crystal (FLC), anti-ferroelectric liquid crystal (AFLC), optically compensatory bend (OCB), super twisted nematic (STN), vertically aligned (VA), and hybrid aligned nematic (HAN) have been suggested.

EXAMPLES

Hereinafter, the present invention will be described in more detail with reference to the Examples. Materials, use amounts, proportions, processing contents, processing procedures and the like shown in the following Examples may be appropriately modified as long as the modification does not deviate from the gist of the present invention. Therefore, the scope of the present invention is not limited to the following specific examples.

Example 1

(Preparation of Cellulose Acylate)

By the methods described in Japanese Patent Laid-Open Publication Nos. H10-45804 and H08-231761, cellulose acylate was synthesized and the substitution degree thereof was measured. Specifically, an acylation reaction was performed at 40° C. by adding sulfuric acid (7.8 parts by mass with respect to 100 parts by mass of cellulose) as a catalyst thereto, and adding carboxylic acid which is a raw material for an acyl substituent. In this case, the kind and substitution degree of the acyl group were adjusted by adjusting the kind and amount of the carboxylic acid. Further, ripening was performed at 40° C. after acylation. In addition, the low molecular weight component of cellulose acylate (cellulose acetate) was washed with acetone and removed, and a cellulose acylate having an average acyl substitution degree of 2.43 and a cellulose acylate having an average acyl substitution degree of 2.81 were obtained.

<Preparation of Dope for Forming Core Layer>

Into a mixing tank, the following composition was introduced and stirred, and each component was dissolved to prepare a cellulose acetate solution (hereinafter, also referred to as a dope solution). The obtained dope was defined as Dope A1 for forming a core layer.

| | |
|---|---|
| Cellulose acetate (Substitution degree 2.43) | 122 parts by mass |
| Following Compound-1 | 4.9 parts by mass |
| Following Compound-2 | 2.8 parts by mass |
| Methylene chloride | 548 parts by mass |
| Methanol | 82 parts by mass |

The concentration of the solid content was adjusted to 17% by mass, and the concentration of cellulose acetate was adjusted to 16.2% by mass.

Compound-1

An ester oligomer composed of the following dicarboxylic acid and diol

TABLE 1

| Dicarboxylic acid | | Diol | | | Number |
|---|---|---|---|---|---|
| Terephthalic acid unit (mol %) | Succinic acid unit (mol %) | Ethylene glycol unit (mol %) | Propylene glycol unit (mol %) | Terminal | average molecular weight |
| 70 | 30 | 50 | 50 | Acetyl group | 1,200 |

Compound-2

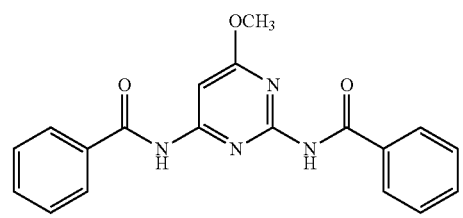

<Preparation of Dope for Forming Skin Layer>

Into a mixing tank, the following composition was introduced and stirred, and each component was dissolved to prepare a dope for a skin layer.

| | |
|---|---|
| Cellulose acetate (Substitution degree 2.81) | 87 parts by mass |
| The aforementioned Compound-1 | 3.5 parts by mass |
| The aforementioned Compound-2 | 2.0 parts by mass |
| Methylene chloride | 455 parts by mass |
| Methanol | 70 parts by mass |

The concentration of the solid content was adjusted to 15% by mass, and the concentration of cellulose acetate was adjusted to 14.1% by mass.

<Film Formation of Cellulose Acylate Film>
(Casting)

Casting was carried out using a band casting machine using the dope for forming a core layer and the dope for forming a skin layer, which had been prepared as described above. When the dope solution was cast, the dope solution was cast on an endless band 7 running from a casting die 6 as illustrated in FIG. 1. Alternatively, the residual solvent amount of the film on the band was calculated based on the following Equation (3) by defining the film thickness measured by a non-contact type film thickness meter at any time point as d1, drying a web in which d1 was measured at 110° C. for 3 hours to completely dry the film, defining the film thickness measured by the same method as d2, and using d1 and d2.

Residual solvent amount={(the film thickness of the film while being dried $d1$−the film thickness of the completely dried film $d2$)/the film thickness of the completely dried film $d2$}×100   Equation (3)

(Drying Method on Band)

In order to control the temperature after both dopes were discharged from the die 6, the band back surface temperature and the drying air temperature were controlled as follows. The band back surface temperature was controlled by adjusting the rotating roll 1 to 9° C. and the temperature of the temperature control device 3 of the hand back surface to 15° C., and the temperature of the drying air was controlled by setting the temperature of the drying device 4 on the band to 30° C. As a result, the film temperature of each of the volatile matter 300%, the volatile matter 300% to 150%, and the volatile matter 150% to 100% was controlled to 9° C. to 12° C., 12° C. to 18° C., and 18° C. to 22° C., respectively from the die 6. And then, the dope was further dried to peel off the film at a solvent amount of approximately 20% from the band. And then, the film was stretched at a stretching temperature Tg and a stretching ratio of 30% while applying a tension of 50 N/m thereto in a tenter zone at a supplied air temperature of 190° C., thereby producing a cellulose acylate film. In this case, the thickness of the cast film was adjusted such that the film thickness after stretching became 40 μm.

Films of Examples 2 to 20 and Comparative Examples 1 to 4 were produced by making the conditions equal to those of Example 1 to differently change the average acyl substitution degree and concentration of the cellulose acylate used, the film thicknesses of the core layer and the skin layer, the temperature conditions during the drying, and the like as shown in the following Table 2.

For each film obtained, an evaluation test was performed using the items shown below.

<<Thickness of Mixed Layer>>

The cellulose acylate film was obliquely cut at an angle of 1° with respect to the surface of the film toward the thickness direction of the film from the surface of the film at the skin layer side, and the produced inclined surface of the film was analyzed using time of flight-secondary ion mass spectrometry (TOF-SIMS). A range of 500 μm in width was measured from a position which was 5 μm away in an inclined direction from the end of the surface of the film at the skin layer side in the inclined surface of the film using TOF-SIMS5 (trade name) manufactured by ION-TOF Corp., and a secondary ion intensity distribution was obtained. Accordingly, a secondary ion intensity of a region corresponding to a depth of 8 μm from the surface of the skin layer was quantified. The intensity ratio f was calculated by detecting fragment ion A (m/z169) and fragment ion B (m/z127) derived from cellulose molecules, and using the intensity of each fragment ion obtained and the following Equation (4).

$f$=(Ion Intensity of $B$)/(Ion Intensity of $A$)   Equation (4)

Since a higher average acyl substitution degree leads to a smaller intensity ratio f, and f assumes a linear relationship with the average acyl substitution degree, f corresponds to the average acyl substitution degree. Accordingly, in a laminated body including a core layer and a skin layer, which were composed of cellulose acylates having different substitution degrees, f corresponding to the average acyl substitution degree was calculated by measuring the range of 500 μm in width from the position which was 5 μm away in an inclined surface direction from the surface end of the inclined surface of the film.

The f of the position of x (nm) in the depth direction measured by TOF-SIMS was defined as fx, and the range of x of the film in which fx satisfied Equation (A2) in the thickness direction was obtained as a thickness of a mixed layer.

$fs+0.05\times(fc-fs) \leq fx \leq fc-0.05\times(fc-fs)$   Equation (A2)

In the fs in Equation (A2), fx and fc are defined as the minimum value and the maximum value, respectively in a range of 500 μm in width from the position which is 5 μm away in an inclined direction from the end of the surface in the inclined surface of the film.

<<Retardation>>

For the film obtained, Re and Rth at a wavelength of 550 nm were measured by the above-described method using an automatic birefringence meter KOBRA-21 ADH (manufactured by Scientific Instruments Co., Ltd.).

<<Evaluation of Surface Shape After Film Formation>>

The observation of a Schaukasten was performed under a cross-nicol environment in a state where the obtained cellulose acylate film was closely adhered to a polarizer, and the evaluation was made as follows.

1: There is no unevenness which may be viewed as a Schaukasten.

2: There is an unevenness which may be weakly viewed as a Schaukasten at 1 point/10 m² of the film area.

3: There is an unevenness which may be viewed as a Schaukasten at 2 points/10 m² of the film area.

4: There is an unevenness which may be viewed as a Schaukasten at 3 points/10 m² of the film area.

<Preparation of Polarizing Plate>

The surface of the cellulose acylate film prepared above in each Example and Comparative Example was subjected to alkali saponification treatment. The film was immersed in a 1.5-regulated sodium hydroxide aqueous solution at 45° C. for 2 minutes, washed in a washing bath at room temperature, and neutralized using 0.1-regulated sulfuric acid at 30° C. The film was washed once again in the washing bath at room temperature and again dried using warm air at 100° C.

Next, a roll-shaped polyvinyl alcohol film having a thickness of 80 μm was continuously stretched by 5 times in an aqueous iodine solution and dried to obtain a polarizer having a thickness of 20 μm.

The alkali saponification treated cellulose acylate film in each Example and Comparative Example and an alkali saponification treated Fujitac TD8OUL (manufactured by Fuji Photo Film Co., Ltd.) which was the same as the cellulose acylate film were prepared using a 3% aqueous solution of polyvinyl alcohol (PVA-117H manufactured by Kuraray Co., Ltd.) as an adhesive and joined to each other by sandwiching a polarizer therebetween such that the saponified surfaces thereof became the polarizer side, and a polarizing plate in which a laminated film of the cellulose acylate in each Example and Comparative Example and TD80UL were a protective film of the polarizer was each obtained.

In this case, each laminated film of cellulose acylate was adhered to TD80UL such that the MD direction of the laminated film and the slow axis of TD80UL became parallel to the absorption axis of the polarizer. The obtained polarizing plate was used as a polarizing plate in each Example and Comparative Example.

<<Evaluation of Adhesion of Polarizing Plate>>

An acrylic tackifier sheet was joined to the TD80UL surface of the polarizing plate prepared. The obtained tackifier attached polarizing plate was cut into a test specimen having a width of 25 mm and a length of about 80 mm, the tackifier surface thereof was joined to soda glass, and then the pressurization treatment was performed in an autoclave at a pressure of 5 kgf /cm$^2$ and a temperature of 50° C. for 20 minutes, and the sample was again left to stand under an atmosphere of a temperature of 23° C. and a relative humidity of 10% overnight. In this state, a cutting was introduced at an angle of 45° into the film in each Example and Comparative Example and the polarizer using a cutter blade, one end (one side having a width of 25 mm) of the film in each Example and Comparative Example was floated to 10 mm, and a polyethylene terephthalate (PET) film with a width of 25 mm and a length of 80 mm was fixed to the floated side, such that a side having a width of 25 mm was overlapped at 10 mm. A PET film in which one end (one side having a width of 25 mm) of the test specimen was elongated in a longitudinal direction was gripped using a tensile tester (RTF 1210manufactured by A&D Co., Ltd.) and subjected to a 90-degree peel test under an atmosphere of a temperature of 23° C. and a relative humidity of 10% at a crosshead speed (grip moving speed) of 200 mm/min to evaluate an interlayer peeling force at the film in each Example and Comparative Example. The breaking of the film during the tensile test was determined to exceed the measurement upper limit and marked as 10 N or more.

<<Cutting Processing Suitability (Punching Processing Suitability) of Polarizing Plate>>

5 polarizing plates obtained as described above were overlapped, 100 sheets were punched by a 10 cm-angle Thompson blade, such that the blade was allowed to enter from the TD80UL side, and the edge when the polarizing plate was cut was observed by a microscope (magnification 10 times) to evaluate the frequency and width of cracks. The cutting was performed at low humidity (25° C. and a relative humidity of 10%).

1: No generation of cracks with a width of 100 μm or more
2: 1 to 2 sheets of generation of cracks with a width of 100 μm or more
3: 3 to 5 sheets of generation of cracks with a width of 100 μm or more
4: More than 5 sheets of generation of cracks with a width of 100 μm or more

[Preparation of Liquid Crystal Display]

Two polarizing plates in each Example and Comparative Example were used to adhere the polarizing plate to the liquid crystal cell of vertical alignment (VA) so as to allow the absorption axes of each polarizing plate to be orthogonal to each other, such that the cellulose ac late film in each Example and Comparative Example became the liquid crystal cell side, and the liquid crystal display devices in each Example and Comparative Example were respectively prepared. A VA liquid crystal cell was used by peeling off a polarizing plate and a phase difference plate on the two sides of a liquid crystal TV (LC40-F3, manufactured by Sharp Corp.) of VA mode.

<<Evaluation of Liquid Crystal Display>>

With respect to the prepared liquid crystal display device, the liquid display was brought into a state displaying black in a dark room, and the black brightness at a polar angle of 60° and an azimuth angle of 45° was measured using a measuring machine (EZ-Contrast XL88, manufactured by ELDIM Corp.), and the evaluation was made based on the following criteria.

1: 0.5 cd/m$^2$ or less
2: more than 0.5 cd/m$^2$ and 1.0 cd/m$^2$ or less
3: more than 1.0 cd/m$^2$ and 1.5 cd/m$^2$ or less
4: more than 1.5 cd/m$^2$ 1 to 3 were not practically problematic, and 4 had severe light leakage, and thus was practically problematic.

The evaluation results are shown in the following Tables 3 and 4.

TABLE 2

| | Prescription | | | | | | Dry Temperature Control | |
|---|---|---|---|---|---|---|---|---|
| | Core Layer | | | Skin Layer | | | Conditions on Band | |
| | | Conc. of | Finished | | Conc. of | Finished | | |
| E./C.E. | Substitution degree/— | solid content/ % by mass | film thickness/ μm | Substitution degree/ — | solid content/ % by mass | film thickness/ μm | Temp. of rotating roll 1/° C. | Temp. of band surface air 3/° C. |
| E. 1 | 2.43 | 17 | 37 | 2.81 | 15 | 1.2 | 9 | 15 |
| E. 2 | 2.43 | 17 | 37 | 2.81 | 15 | 1.2 | 9 | 15 |
| E. 3 | 2.43 | 17 | 37 | 2.81 | 15 | 1.2 | 9 | 18 |
| E. 4 | 2.43 | 17 | 37 | 2.81 | 15 | 1.2 | 12 | 24 |
| C.E. 1 | 2.43 | 17 | 37 | 2.81 | 15 | 1.2 | 20 | 30 |
| E. 5 | 2.43 | 17 | 37 | 2.81 | 15 | 1.2 | 5 | 15 |
| E. 6 | 2.43 | 17 | 37 | 2.81 | 15 | 1.2 | 0 | 12 |
| E. 7 | 2.43 | 17 | 37 | 2.81 | 15 | 1.2 | −5 | 12 |
| C.E. 2 | 2.43 | 17 | 37 | 2.81 | 15 | 1.2 | −10 | 12 |
| E. 8 | 2.43 | 19 | 37 | 2.81 | 17 | 1.2 | 9 | 15 |
| E. 9 | 2.43 | 21 | 37 | 2.81 | 19 | 1.2 | 9 | 15 |
| E. 10 | 2.43 | 23 | 37 | 2.81 | 21 | 1.2 | 9 | 15 |
| E. 11 | 2.43 | 15 | 37 | 2.81 | 13 | 1.2 | 9 | 15 |
| E. 12 | 2.43 | 13 | 37 | 2.81 | 11 | 1.2 | 9 | 15 |

TABLE 2-continued

| E. 13 | 2.43 | 11 | 37 | 2.81 | 9 | 1.2 | 9 | 15 |
| E. 14 | 2.10 | 17 | 37 | 2.81 | 15 | 1.2 | 9 | 15 |
| C.E. 3 | 1.90 | 17 | 37 | 2.81 | 15 | 1.2 | 9 | 15 |
| E. 15 | 2.43 | 17 | 37 | 2.93 | 15 | 1.2 | 9 | 15 |
| E. 16 | 2.43 | 17 | 60 | 2.81 | 15 | 1.5 | 9 | 15 |
| C.E. 4 | 2.43 | 17 | 60 | 2.81 | 15 | 1.5 | 20 | 45 |
| E. 17 | 2.43 | 17 | 37 | 2.81 | 15 | 1.5 | 9 | 15 |
| E. 18 | 2.43 | 17 | 37 | 2.81 | 15 | 1.5 | 9 | 15 |
| E. 19 | 2.43 | 17 | 37 | 2.81 | 15 | 1.5 | 9 | 15 |
| E. 20 | 2.43 | 17 | 37 | 2.81 | 15 | 1.5 | 9 | 15 |

| | Dry Temperature Control Conditions on Band | | | | | |
|---|---|---|---|---|---|---|
| E./C.E. | Temp. of band upper dry air 4/° C. | Film temp. of volatile matter 300% from die 6/° C. | Film temp. of volatile matter 300% to 150%/° C. | Film temp. of volatile matter 150% to 100%/° C. | Film temp. of peeling from volatile matter 100 wt %/° C. | Drawing ratio |
| E. 1 | 30 | 9~12 | 12~18 | 18~22 | 22~35 | 30 |
| E. 2 | 35 | 9~14 | | | | |
| E. 3 | 40 | 9~16 | | | | |
| E. 4 | 40 | 12~24 | | | | |
| C.E. 1 | 40 | 20~25 | | | | |
| E. 5 | 30 | 5~11 | | | | |
| E. 6 | 30 | 0~10 | | | | |
| E. 7 | 30 | -2~9 | | | | |
| C.E. 2 | 30 | -8~5 | | | | |
| E. 8 | 30 | 9~12 | 12~18 | 18~22 | 22~35 | 30 |
| E. 9 | 30 | 9~12 | 12~18 | 18~22 | 22~35 | 30 |
| E. 10 | 30 | 9~12 | 12~18 | 18~22 | 22~35 | 30 |
| E. 11 | 30 | 9~12 | 12~18 | 18~22 | 22~35 | 30 |
| E. 12 | 30 | 9~12 | 12~18 | 18~22 | 22~35 | 30 |
| E. 13 | 30 | 9~12 | 12~18 | 18~22 | 22~35 | 30 |
| E. 14 | 30 | 9~12 | 12~18 | 18~22 | 22~35 | 30 |
| C.E. 3 | 30 | 9~12 | 12~18 | 18~22 | 22~35 | 30 |
| E. 15 | 30 | 9~12 | 12~18 | 18~22 | 22~35 | 30 |
| E. 16 | 45 | 9~12 | 12~18 | 18~22 | 22~40 | 30 |
| C.E. 4 | 70 | 20~25 | 25~30 | 30~34 | 34~40 | 30 |
| E. 17 | 30 | 9~12 | 12~18 | 18~22 | 22~35 | 30 |
| E. 18 | 30 | 9~12 | 12~18 | 18~22 | 22~35 | 30 |
| E. 19 | 30 | 9~12 | 12~18 | 18~22 | 22~35 | 30 |
| E. 20 | 30 | 9~12 | 12~18 | 18~22 | 22~35 | 30 |

TABLE 3

| | Evaluation Result of Film | | | | Evaluation Result of Polarizing Plate | |
|---|---|---|---|---|---|---|
| Ex./C. Ex. | Re/nm | Rth/nm | Thickness of mixed layer/nm | Surface shape after film formation | Interlayer adhesive force/N | Polarizing plate cutting test |
| Ex. 1 | 45 | 125 | 180 | 1 | 10N or more | 1 |
| Ex. 2 | 45 | 125 | 175 | 1 | 9 | 2 |
| Ex. 3 | 45 | 125 | 160 | 1 | 8 | 2 |
| Ex. 4 | 45 | 125 | 100 | 1 | 4 | 3 |
| C. Ex. 1 | 45 | 125 | 50 | 1 | 1 | 4 |
| Ex. 5 | 45 | 125 | 200 | 2 | 10N or more | 1 |
| Ex. 6 | 45 | 125 | 220 | 3 | 10N or more | 1 |
| Ex. 7 | 45 | 125 | 250 | 3 | 10N or more | 1 |
| C. Ex. 2 | 45 | 125 | 350 | 4 | Not evaluated | Not evaluated |
| Ex. 8 | 45 | 125 | 150 | 1 | 7 | 2 |
| Ex. 9 | 45 | 125 | 110 | 1 | 5 | 3 |
| Ex. 10 | 45 | 125 | 100 | 1 | 4 | 3 |
| Ex. 11 | 45 | 125 | 200 | 2 | 10N or more | 1 |
| Ex. 12 | 45 | 125 | 220 | 3 | 10N or more | 1 |
| Ex. 13 | 45 | 125 | 300 | 3 | 10N or more | 1 |
| Ex. 14 | 55 | 140 | 150 | 1 | 8 | 1 |
| C. Ex. 3 | 85 | 180 | 60 | 1 | 2 | 4 |
| Ex. 15 | 45 | 125 | 110 | 1 | 5 | 3 |
| Ex. 16 | 45 | 125 | 180 | 1 | 10N or more | 1 |
| C. Ex. 4 | 45 | 125 | 50 | 1 | 1 | 4 |
| Ex. 17 | 55 | 140 | 180 | 1 | 10N or more | 1 |
| Ex. 18 | 65 | 150 | 180 | 1 | 10N or more | 1 |
| Ex. 19 | 40 | 100 | 180 | 1 | 10N or more | 1 |
| Ex. 20 | 35 | 95 | 180 | 1 | 10N or more | 1 |

In Tables 2 and 3, it could be seen that the cellulose acylate films obtained in the Examples had a good interlayer adhesive force, surface shape, optical expression properties, and display performance. In particular, it was a result that the interlayer adhesive force became good depending on the thickness of the mixed layer.

Meanwhile, in Comparative Examples 1 and 4, it was a result of the lack of interlayer adhesion that the thickness of the mixed layer became less than 100 nm by drying on the band. Furthermore, in Comparative Example 2, it was a result that the thickness of the mixed layer became more than 300 nm by drying on the band, and the surface shape of the film after the film formation deteriorated. In addition, the adhesive force was not evaluated.

TABLE 4

| Ex./C. Ex. | Panel Evaluation Result Black Display Performance of Slope |
|---|---|
| Ex. 1 | 1 |
| Ex. 12 | 3 |
| Ex. 13 | 1 |
| Ex. 16 | 2 |
| Ex. 17 | 3 |
| Ex. 18 | 2 |
| Ex. 19 | 3 |

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. A cellulose acylate film comprising a core layer and a skin layer, in which a mixed layer is formed between the core layer and the skin layer, wherein a cellulose acylate included in the core layer has an average acyl substitution degree S2 of 2.00 to 2.55, a cellulose acylate included in the skin layer has an average acyl substitution degree S3 of 2.60 to 2.95, and an average acyl substitution degree S1 of the cellulose acylate of the mixed layer satisfies Equation (A1), and the mixed layer has a thickness of 100 nm to 300 nm:

$$S2+0.05\times(S3-S2)<S1<S3-0.05\times(S3-S2). \qquad \text{Equation (A1)}$$

2. The cellulose acylate film according to claim 1, wherein an in-plane retardation Re (550) at a wavelength of 550 nm and a retardation Rth (550) in a thickness direction at a wavelength of 550 nm satisfy the following Equation (1) and Equation (2):

$$30 \text{ nm} \leq Re(550) \leq 80 \text{ nm} \qquad \text{Equation (1)}$$

$$80 \text{ nm} \leq Rth(550) \leq 200 \text{ nm}. \qquad \text{Equation (2)}$$

3. The cellulose acylate film according to claim 1, wherein a difference between the average acyl substitution degree of the cellulose acylate contained in the core layer and the average acyl substitution degree of the cellulose acylate contained in the skin layer is 0.81 or less.

4. A polarizing plate comprising a polarizer and the cellulose acylate film according to claim 1,
wherein the polarizer is joined to the skin layer.

5. The polarizing plate according to claim 4,
wherein an adhesive force between the polarizer and the cellulose acylate film is 4.0 N or more.

* * * * *